US00RE34135E

United States Patent [19]

Madsen et al.

[11] E Patent Number: Re. 34,135

[45] Reissued Date of Patent: Dec. 1, 1992

[54] LIGHT MATRIX DISPLAY SYSTEM

[75] Inventors: Brent Madsen; Greg Slobodzian, both of Logan; Bill Kersey, Salt Lake City, all of Utah; Brent Madsen, Providence, all of Utah

[73] Assignee: Intergrated Systems, Logan, Utah

[21] Appl. No.: 506,861

[22] Filed: Apr. 9, 1990

Related U.S. Patent Documents

Reissue of:

[64] Patent No.: 4,820,956
Issued: Apr. 11, 1989
Appl. No.: 104,118
Filed: Oct. 2, 1987

[51] Int. Cl.[5] ..... G08B 5/36; G09F 9/307; H01R 33/00

[52] U.S. Cl. ..... 315/250; 40/550; 313/51; 315/312; 340/780; 439/888; 439/890

[58] Field of Search ..... 315/178, 179, 184, 185 R, 315/185 S, 192, 250, 288, 312; 313/51, 318; 358/240; 40/550; 340/780; 439/235, 375, 381, 611, 615, 617, 618, 790, 890, 918, 888

[56] References Cited

U.S. PATENT DOCUMENTS

| | | | |
|---|---|---|---|
| 2,992,364 | 7/1961 | Rasmussen | 315/184 |
| 3,373,419 | 3/1968 | Mathamel | 315/84.51 X |
| 3,941,926 | 3/1976 | Slobodzian et al. | 358/240 X |
| 4,134,132 | 1/1979 | Magos et al. | 358/240 |
| 4,234,914 | 11/1980 | Boesen | 40/550 X |
| 4,724,629 | 2/1988 | Walton | 40/550 X |
| 4,771,278 | 9/1988 | Pooley | 340/780 |

*Primary Examiner*—Eugene R. LaRoche
*Attorney, Agent, or Firm*—Workman, Nydegger & Jensen

[57] ABSTRACT

A light matrix display system and a lamp socket for use therein. The lamp socket receives a single lamp which may be easily replaced by another lamp. The lamp socket is also designed so that it may be readily replaced if necessary. A solid state switching circuit is replaceably mounted on each lamp socket. Thus, if a switching circuit fails, it may be quickly replaced without disturbing the operation of other lamps. The light matrix display system includes a plurality of lamps arranged in rows and columns. A plurality of row control conductors and column control conductors are provided which are connected to a matrix system controller. Hot and neutral AC current supplying conductors and one row control conductor and one column control conductor are directly connected to each lamp socket and the switching circuit associated with the lamp socket. When proper voltages are placed on the row and column control conductors connected to a lamp socket, current flows through the solid state switching circuit, which turns on the corresponding lamp.

32 Claims, 5 Drawing Sheets

LIGHT MATRIX DISPLAY SYSTEM

Matter enclosed in heavy brackets [ ] appears in the original patent but forms no part of this reissue specification; matter printed in italics indicates the additions made by reissue.

BACKGROUND

1. The Field of the Invention

The present invention relates to light matrix display systems. More particularly, the present invention relates to light display systems wherein a plurality of individual light elements are arranged in an X-Y matrix and each light element is controllably switched on or off so that images such as alphanumeric characters, graphic elements, or pictures are formed on the display.

2. The Background Art

The number of light matrix display systems used throughout the world is increasing every year. Light matrix display systems range in size from extremely large displays used in sports stadiums to show scores, times, and animated color pictures to small systems located on store fronts which display messages such as the time and the temperature in numbers only a few inches high.

Regardless of the size of the display, all presently available light matrix displays use a plurality of light elements arranged in an X-Y matrix. The individual light elements are selectively switched on or off in order to form the image. The individual light element is generally a single light generating device, such as a common incandescent light bulb.

In light matrix display systems it is common to refer to the smallest nondivisible portion of the image-forming area of the display as picture elements or "pixels." In small light matrix display systems, the light element and the pixel may be equivalent. That is, each pixel contains only one element, i.e., one lamp. In more complicated light matrix display systems, such as those providing color images, several light elements, for example, red, blue, and green lamps, may be included in each pixel so that each pixel may appear red, blue, and/or green.

In most light matrix display systems intended to be viewed by large numbers of people, it is generally the practice to use incandescent lamps as the light element. Incandescent lamps are resistive devices which inherently require a relatively large amount of current to produce a suitable light output. Furthermore, incandescent lamps are also susceptible to both electrical and mechanical failure due to the fragile nature of the lamp filament while illuminated.

In previously available light matrix display systems it is common to fabricate a large matrix by using smaller segments, for example a segment containing an $8\times8$ lamp matrix having a total of 64 lamps. Each segment, or bank as it is sometimes referred to, is controlled by a discrete collection of lamp driver circuits housed in a package referred to as a driver pack. Alternatively, another approach commonly used is to mount individual lamp driver circuits, one for each light element, on printed circuit cards which are removably mounted in a rack.

Safety concerns and the restrictions of the National Electrical Code limit the number of lamps which may be driven from one driver pack or driver card rack. Regardless of whether the "driver pack" or "driver rack" approach is adopted, the driver circuits which control the individual light elements must be readily replaceable for reasons which will be clearly explained shortly.

In previously available light matrix display systems the lamp drivers, whether located in a driver pack or on a plurality of driver cards, are usually located some distance away from the lamp segment which is being driven. This distance may vary from a few feet to tens of feet depending upon the type of display. For example, in an $8\times96$ light matrix display (a long narrow display), the display may consist of twelve $8\times8$ segments, where each segment is provided with its own driver pack. The driver packs, as commonly used, are located near a load center and are connected to high current capacity AC supply lines.

Before the widespread use of semiconductor power switching devices, mechanical relays or electro-mechanical machines were used as switching devices. The use of mechanical relays, or electro-mechanical machines resulted in extremely bulky circuits for a light matrix display as well as a circuit which required constant maintenance and was prone to failure. While the use of semiconductor switching devices as control devices has increased the reliably of, and reduced the maintenance required by, light matrix display systems, the use of semiconductor switching devices in the systems available in the prior art has several inherent drawbacks.

Among the many semiconductor switching devices now available, the triac is commonly used in light matrix display systems. As will be appreciated by those skilled in the art, a triac is a device which can control a relatively large current e.g., from a few amps to hundreds of amps, while a current on the order of a few milliamps is applied to the control gate of the device. Furthermore, when provided with proper heat dissipation means, very small triacs may "control" large currents.

In previously available light matrix display systems, on triac would be provided in the driver pack or rack mounted board for each lamp to be driven. As is commonly known, triacs inherently possessed some internal resistance while in their "turned on" state and thus each triac generates some heat. When a plurality of operating triacs are housed within a driver pack which is enclosed to protect it from damage and the environment, the accumulated heat can often cause premature triac failure.

Furthermore, when a triac is located more than a few inches away from its corresponding lamp, such as when a plurality of triacs are grouped in a driver pack or driver rack, it necessitates that heavy gauge conductors be used to connect each individual lamp to its corresponding triac to reduce power losses and avoid heat generation in the wires. The use of heavy gauge conductors running between each lamp and the driver pack makes assembly and maintenance of the light matrix display system awkward and cumbersome.

Moreover, in previously available systems each wire had to be individually attached to each lamp socket by use of a wire nut or similar device. Still further, the switching of relatively high currents over the relatively long conductor runs between the driver pack or card rack and the lamp often causes undesirable inductive surges which both interfere with the signals on nearby wiring (causing flickering of extinguished lamps) and cause failure of the triac itself as well as the lamp.

Even during the normal operation of light matrix display systems, triacs will often fail. Furthermore, it is often the case that lamps (which are expected to regularly fail) will fail because the filament leads short together, thus causing a dramatic momentary high current surge which will destroy the triac. Still further, transient current surges also occur due to fluctuations in line voltages and varying operational conditions. It is also common to find that triacs have failed due to shorting together of the heavy gauge conductors which are "bundled" in large groups running between the driver pack or card rack and the lamps. Overall, triacs are susceptible to failure due to occasional high current surges and due to cumulative effects of many smaller current surges, the adverse effects of which are multiplied several fold when the triac is operated at a high ambient temperature.

Incandescent lamps generally have an expected life of less than 10,000 hours and thus may be regularly replaced, especially in those systems which operate continuously. In most systems, sockets are used to removably secure the lamps in place and to provide proper electrical contact between the heavy gauge conductors and the lamps. The sockets themselves, however, often fail due to physical damage, wear, or exposure to a harsh environment.

Still further, in previously available systems, the driver packs, or driver cards, have both high current devices (triacs) and low current control circuitry (such as digital devices) located side by side. Positioning the low voltage control circuitry in both electrical and physical proximity to the high current devices increases the likelihood of a failure in the low voltage control circuitry.

In the previously available light matrix display systems the usual troubleshooting procedure is to test the lamp, the socket, and the triac associated with the non-operative lamp, in that order. If neither the lamp or the socket is at fault, it is necessary to replace the entire driver pack, or in the case of a "rack driver" the entire driver card associated with the non-operative lamp, while the suspect unit is taken back to the shop and subjected to further troubleshooting procedures.

Following this procedure, the technician must often check the lamp and socket location and then move to the driver pack/card rack location to complete the check of the circuit. This procedure is carred out for each inoperative lamp. Thus, a technician performing maintenance on a light matrix display system must expend a substantial amount of time moving between the lamps on the segment and the driver pack, and he or she must carry a substantial number of driver packs, or driver cards, to use as replacements. A repair technician is required to carry a valuable inventory of complete replacement drivers even though it is most likely that only a single triac within the driver unit requires replacement.

OBJECTS AND BRIEF SUMMARY OF THE INVENTION

In view of the foregoing difficulties and drawbacks inherent in the light matrix display systems previously available, it would be a significant advance in the art and is thus a primary object of this invention to provide a light matrix display system wherein individual sockets and their components can be individually tested and replaced at the site of the matrix display. A related object is to provide a light matrix display system in which the distance between the semiconductor switching device associated with a lamp and the lamp itself is minimized.

It would be a further advance in the art and is an object of the invention to provide a light matrix display system wherein long runs of heavy gauge conductors carrying high currents which are switched on and off are not placed in electrical or physical proximity to the semiconductor switching devices. Yet another object is to provide a light matrix display system in which individual semiconductor switching devices associated with each lamp are readily and individually replaceable.

Still other related objects are: to provide a light matrix display system in which the semiconductor switching devices are distributed over a large surface to provide high volume ventilation to reduce the operating temperature of the semiconductor switching devices; to provide a light matrix display system in which low voltage control signals may be arranged in an X-Y matrix and applied directly to the associated lamp segment; and to provide a light matrix display system in which the lamp sockets of a display may be directly wired to a power supply bus, and in which a single current-supplying conductor may provide current to a large number of lamps.

Still other important objects of the invention are to provide a light matrix display system in which switching noise is kept to a minimum; and which allows low voltage digital electronics to be readily interfaced to the display system.

These and other objects of the present invention will become more fully apparent during an examination of the following description as well as the accompanying drawings and appended claims.

The foregoing objects and advancements in the art are realized in the matrix display system of the present invention.

Briefly summarized, in one embodiment of the present invention, each lamp of a light matrix display system is provided with a socket which readily receives, and makes electrical contact with, a single lamp. The socket is designed with a removable base that can be easily attached to or removed from the light matrix display system. Each socket is also provided with a solid state switching circuit which is also removable, and a plurality of terminals which are adapted to receive conductors that supply high voltage power to the lamp, and conductors carrying low voltage control signals used by the solid state switching circuit to selectively turn on or turn off its associated lamp. With the solid state switching circuit being located at the socket means of the lamp which it controls, both the base of the socket and the switching circuit (which are devices that commonly fail) may be easily replaced at the site of the display system if necessary during maintenance procedures.

In the described embodiment, low voltage control signals are applied to each lamp by a plurality of column control conductors and row control conductors which form a two-dimensional X-Y matrix. Each socket is connected to one column control conductor and one row control conductor. A lamp is switched on when a control signal is asserted on both the column control conductor and the row control conductor for that lamp's socket. In this fashion a plurality of lamps may be controlled by an X-Y matrix of control conductors having a lamp socket connected at each intersection of a row and column control conductor.

DETAILED DESCRIPTION OF THE PREFERRED EMBODIMENT

Figure 1:
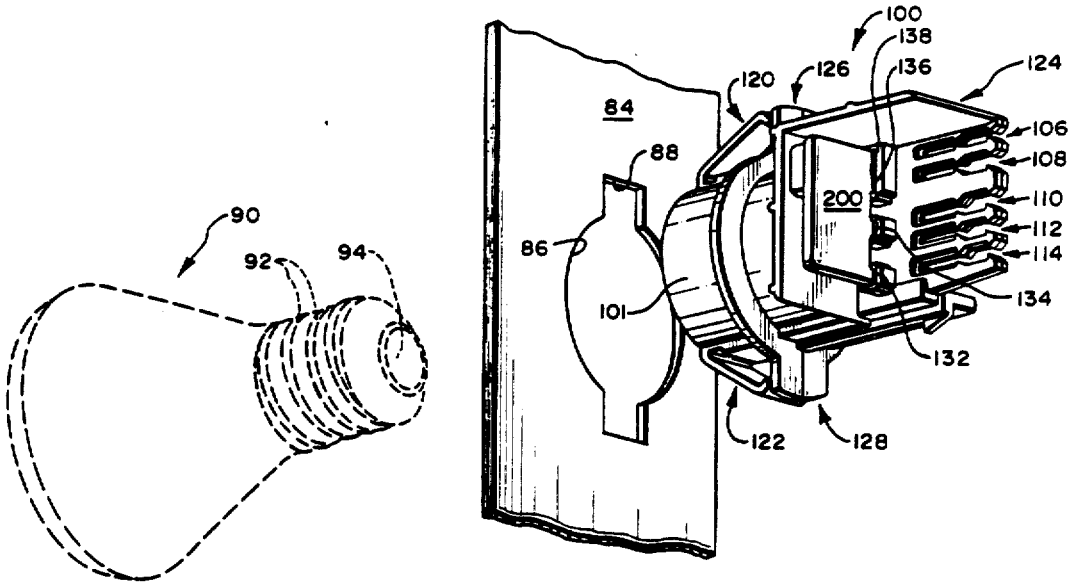
FIG. 1 is a perspective view of one embodiment of a lamp socket as used in the light matrix display system of the present invention.

Reference will now be made to the drawings wherein like structures are provided with like reference numerals throughout. References will first be made to FIG. 1.

At reference numeral 100 there is generally designated an apparatus that serves as a means for providing a socket, shown in a position ready to be attached to a light matrix display system. As mentioned previously, a light matrix display system comprises a plurality of discrete lamps arranged in rows and columns to form an X-Y matrix. Apparatus 100 is just one of a plurality of identical socket means included in the X-Y matrix of the present invention.

Apparatus 100 comprises a base 101 that fits into hole 86 provided in support member 84. Holding clips, generally designated 120 and 122 in FIG. 1, acting in cooperation with the protrusions generally designated 126 and 128, secure the base 101 in place once snap inserted into hole 86 through notches 88, (see also FIG. 3). The use of holding clips 120 and 122 provides that apparatus 100, once secured into place, is unlikely to fall out of position due to vibration and wind loading. Importantly, the clips 120 and 122 also provide a means for detachably mounting base 101 to the matrix support member 84 so that base 101 may be detached and replaced at the support member 84 if the base 101 is found to be defective. This greatly aids in more efficient maintenance of the display system. It will be appreciated that the present invention contemplates that any fastening mechanism which is designed to render the base 101 detachably mountable to support 84 could be used in place of clips 120 and 122.

Provided as part of base 101 is a water hat generally designated 124 which serves as a means for shielding switching circuit 200 from rain, show or debris. Perferable, after clips 120 and 122 are inserted through notches 88, to the position as shown in FIG. 1 so that water hat 124 properly shields switching circuit 200. When in place, the front portion of the base 101 protrudes slightly through hole 86 in member 84.

A lamp, generally designated 90 in FIG. 1 and which in the presently preferred embodiment is a lamp equipped with an edison medium base, is screwed into the base 101. It will be appreciated that many different lamp types and sizes may be used with the present invention. The embodiment illustrated in the figures is adapted for use with the currently preferred lamp type as shown in FIG. 1.

Also shown in FIG. 1 is solid state switching circuit 200 which controls application and removal of power to lamp 90. Electrical outlets 132, 134, 136, and 138 receive the pins 216, 214, 212 and 210 of solid state switching circuit 200. Base terminals generally designated 106, 108, 110, 112, and 114, also illustrated in FIG. 1, provide an efficient method of connecting base 101 to the conductors supplying high voltage power and to the conductors supplying low voltage control current.

Outlets 132, 134, 136 and 138, in cooperation with corresponding pins 216, 214, 212 and 210 of switching circuit 200, provide a means for removable connection of switching circuit 200 to the terminals 114, 112, 110, 108 and 106 which are used to supply the base 101 with high voltage power and low voltage control current. Advantageously, this permits switching circuit 200 to be removed and replaced at base 101 independent of either lamp 90 or base 101 if the switching circuit 200 is found to be defective. In other words, the present invention, in its presently preferred or best mode, contemplates that all these components, e.g., the lamp 90, lamp base 101 and switching circuit 200, can be readily tested and replaced on site at the matrix display system if found to be defective. This can be accomplished, as illustrated, by making all three components independently replaceable of the other components, or, in the alternative, by making various combinations of the three components replaceable. For example, it could be contemplated, in some circumstances, to make the lamp 90 and base 101 as a single unit which is replaceable, separate from switching circuit 200. Likewise, it is also within the scope of the present invention that for some applications, the base 101 and switching circuit 200 could be designed as a single replaceable unit separate from lamp 90.

In previously available light matrix display systems, not only was the switching circuit physically remote from the lamp socket, but replacement of individual components was often difficult or impossible. By adopting the above-described features, the components which are most prone to failure may be easily and quickly replaced by a technician.

Other advantages also accrue from the above-described arrangement. For example, when a lamp fails a repair technician need only perform troubleshooting procedures at one location to return the lamp to operation in the vast majority of cases. As is apparent from the figures, the solid state switching circuit 200 may be replaced without: (1) the removal of the lamp base 101 from the system; (2) the disconnection of any wire conductors from base 101; (3) disassembly of the base; and (4) the aid of any special tools. Furthermore, note that switching circuit 200 is located right at the lamp, thus eliminating physical and electrical proximity of circuit 200 to long runs of conductors carrying high current. Other advantages will become clear as the presently preferred embodiment is described further.

Figure 2:
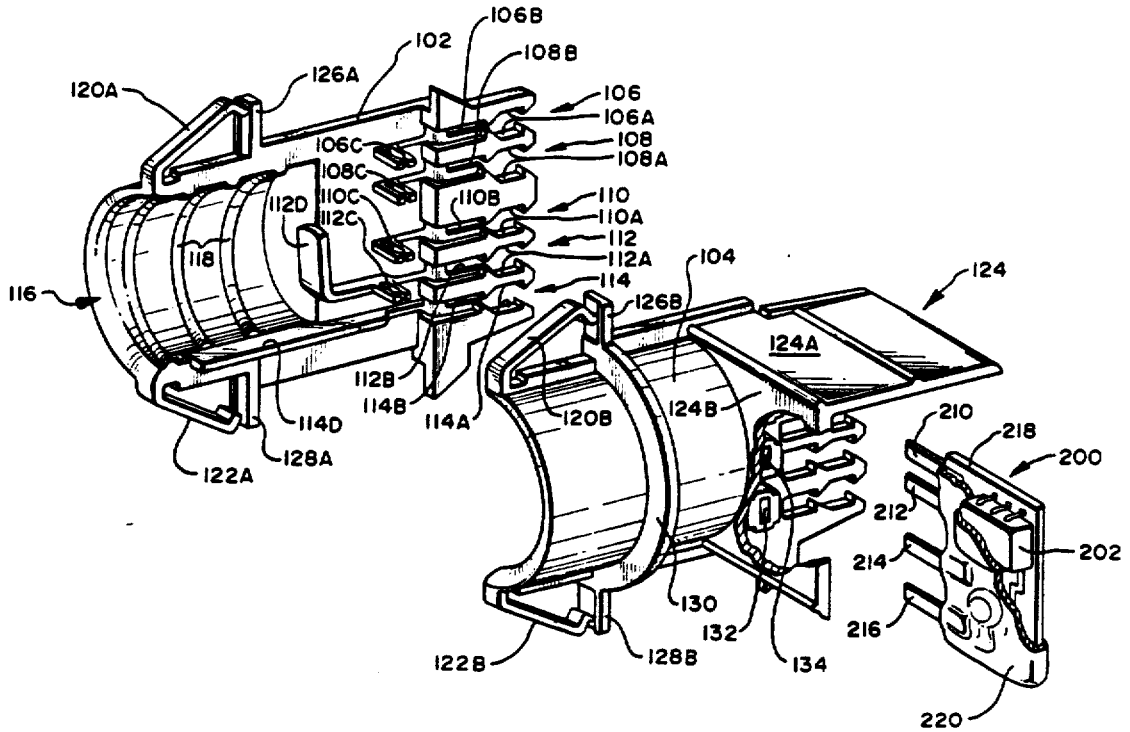
FIG. 2 is an exploded perspective view of the lamp socket illustrated in FIG. 1.

Reference will now be made to FIG. 2 which is an exploded perspective view of the apparatus 100 illustrated in FIG. 1. The presently preferred embodiment of the base 101 is fabricated in two halves, a first body half 102 and a second body half 104, which are preferably fabricated by injection molding. During the assembly process, body halves 102 and 104 are ultrasonically welded together, after the necessary terminal contacts have been positioned, to form base 101.

A socket, generally designated 116 in FIG. 2, is formed in body halves 102 and 104 and is configured, by the inclusion of spiral ridges 118, to be used with lamp 90. Construction of socket 116 must be such that lamp 90 will be securely received by socket 116 for long periods in spite of vibration and wind forces.

Base terminals, generally designated 106, 108, 110, 112, and 114 in FIG. 2, are provided to make contact with high voltage power conductors and low voltage control conductors. As hereinafter more fully described, terminals 110, 112 and 114 provide in combination a first terminal means for electrically contacting the AC hot and neutral conductors which supply power to the lamps. The AC hot conductor 304 (see FIG. 3) is electrically contacted by terminal 110, and is switched through switching circuit 200 to prong 112D of terminal 112 when lamp 90 is turned on. Prong 112D (FIG. 2) makes electrical contact with contact 94 of lamp 90. The AC neutral conductor 302 (see FIG. 3) is electrically contacted by terminal 114, which in turn contacts the neutral contact 92 of lamp 90 by means of the horizontal prong 114D (see FIG. 2).

It should be appreciated that the terms "high voltage power" and "low voltage control current" are relative terms, and are not intended to limit the application of the present invention, as claimed. In some applications, the power supplied to lamp 90 might be at or near the voltage at which the control current is supplied. Accordingly, the term "high voltage power" is intended to merely differentiate the energy used to turn the lamps on when switched by switching circuit 200, from the control signal used to operate the semiconductor device of the switching circuit 200. In many instances, lamp 90 will be operated at 120 volts AC, as opposed to typical 6 to 12 volt DC levels used to control the semiconductor switching device of circuit 200.

Terminals 106 and 108 function as a second terminal means for electrically contacting the conductors 311 and 321 (see FIG. 3) which carry the low voltage control current used to switch the semiconductor device of switching circuit 200. Terminal 112 also functions as a third terminal means for providing interconnection to another lamp 90A (see FIG. 4) which is located remote from lamp 90, as for example on the backside of a second matrix display arranged so that together the two displays will provide a front and back. The remote lamp 90A connected at terminal 112 will thus be controlled by the same switching circuit 200 that controls lamp 90. This arrangement is particularly useful for double sided matrix displays wherein the second parallel side of the display is to be an identical reproduction of the first side. Thus, the expense of providing duplicate control conductors and solid state switching circuits may be avoided in double sided displays by use of the parallel connection at terminal 112.

As can be seen best in FIG. 2, each of the terminals includes a formed metallic contact which is located within first body half 102 during the assembly process. The formed contacts for each terminal are preferably stamped from a sheet of corrosion resistant nickel-silver alloy. Provided below in Table A is a summary of the connections made to terminals 106–114.

TABLE A

| Terminal Reference No. | Connection |
|---|---|
| 106 | Connects to column control conductor. |
| 108 | Connects to row control conductor. |
| 110 | Connects to AC hot bus. |
| 112 | Provides an external parallel slave connection to remote lamp. |
| 114 | Connects to AC neutral bus. |

Each of the terminals 106, 108, 110, 112 and 114 is comprised of a pair of members which together form notched portions as shown, for example, at 106A and 106B in FIG. 2. The first notch 106A acts as a staging area for temporarily holding a conductor until it is set in electrical contact by pushing the conductor into the second notch. The staging areas greatly assist in the rapid assembly of the light matrix display system by holding the conductors in place until they are ready to be anchored.

Figure 3:
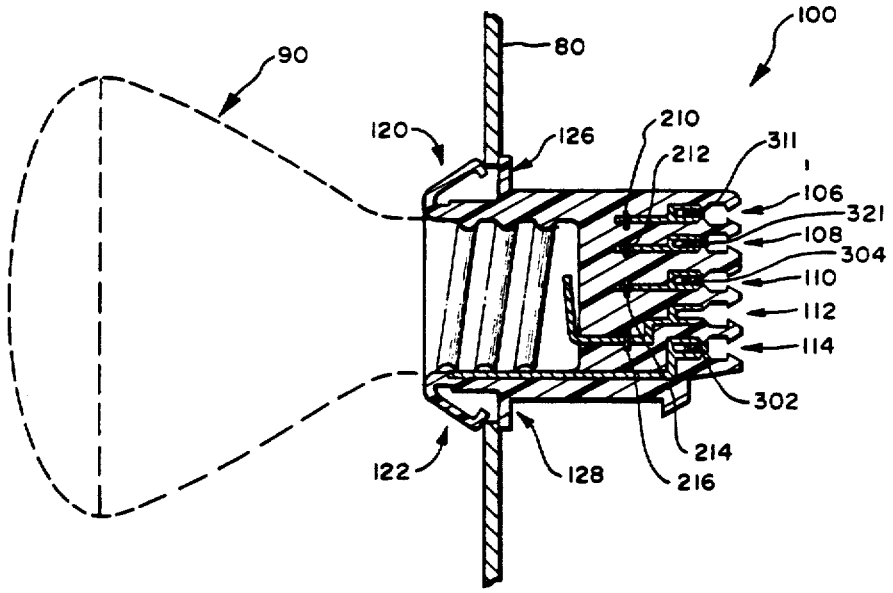
FIG. 3 is an elevated cross sectional view of the lamp socket illustrated in FIG. 1 secured in place on a matrix support member and showing a cross-section of the current supplying conductors and the control conductors held in place at the terminals of the lamp socket.

During assembly of the light matrix display system, the base 101 of each apparatus 100 is first secured in place as shown in FIG. 3. The necessary conductors can then be temporarily staged by stringing them between lamps, placing each conductor in the proper staging area. After the conductors have been strung between the lamps, the conductors may be set into electrical contact by use of a staking tool to push the conductors into the second notch, shown, for example, at 106B, 108B, 110B, 112B, and 114B. The second notch acts as an insulation displacement portion so that when the conductors are pushed into the insulation displacement portion the insulation on the conductors is pierced and electrical contact is made between each of the terminals and their respective conductors. This is shown best in the cross sectional view of FIG. 3 wherein conductors 311, 321, 304, and 302 are shown in cross section with their insulation being pierced and metal-to-metal contact being made between the bare conductor and the insulation displacement portion of the terminal.

One of the other advantages of the above-described arrangement is that the conductors run horizontally through the terminals. This helps prevent the collection of moisture at the terminals. Furthermore, it will be appreciated that all wiring connections, as well as insertion of each base 101 into member 84 and connection of switching circuit 200 to base 101, may be made from the rear, which greatly aids assembly and maintenance of the light matrix display system.

Terminals 106, 108, 100, and 112 are also provided with a corresponding pin receptacle portion 106C, 108C, 110C, and 112C, as shown in FIG. 2. Each of the pin receptacle portions is formed integral with the remainder of the terminal contact and is intended to receive in removable physical contact, as well as adequate electrical contact, pins 210, 212, 214, and 216 (see FIG. 3) of switching circuit 200.

Holes 132, 134, 136, and 138, as shown best in FIG. 1, are provided to allow circuit pins 216, 214, 212, and 210, respectively, to be inserted through second body half 104 so as to make contact with pin receptacle portions 112C, 110C, 108C, and 106C, respectively. In the cross sectional view of FIG. 3, the cross section of the pins 210, 212, 214, and 216 can be seen.

It is desirable that the pin receptacle portions 106C, 108C, 110C and 112C and the pins 210, 212, 214 and 216 be fabricated such that the force required to extract the pins is greater than the force required to insert the pins.

As can be seen best in FIG. 2, pin receptacle 112C is electrically connected to prong 112D which serves as a lamp base contact. Also, terminal 114 is electrically connected to horizontal prong 114D which serves as the other lamp contact. Pin receptacles 106C and 108C provide electrical connections between the control conductors (shown in cross section in FIG. 3 at 311 and 321) and board pins 210 and 212, respectively.

Figure 4:
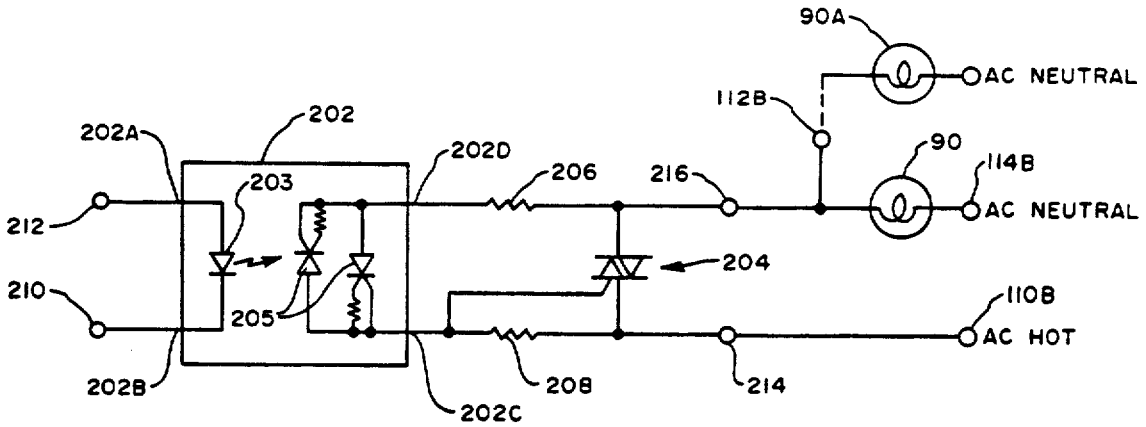
FIG. 4 is an electrical schematic diagram of one presently preferred embodiment of a solid state switching circuit used in the system of the present invention.
Figure 5:
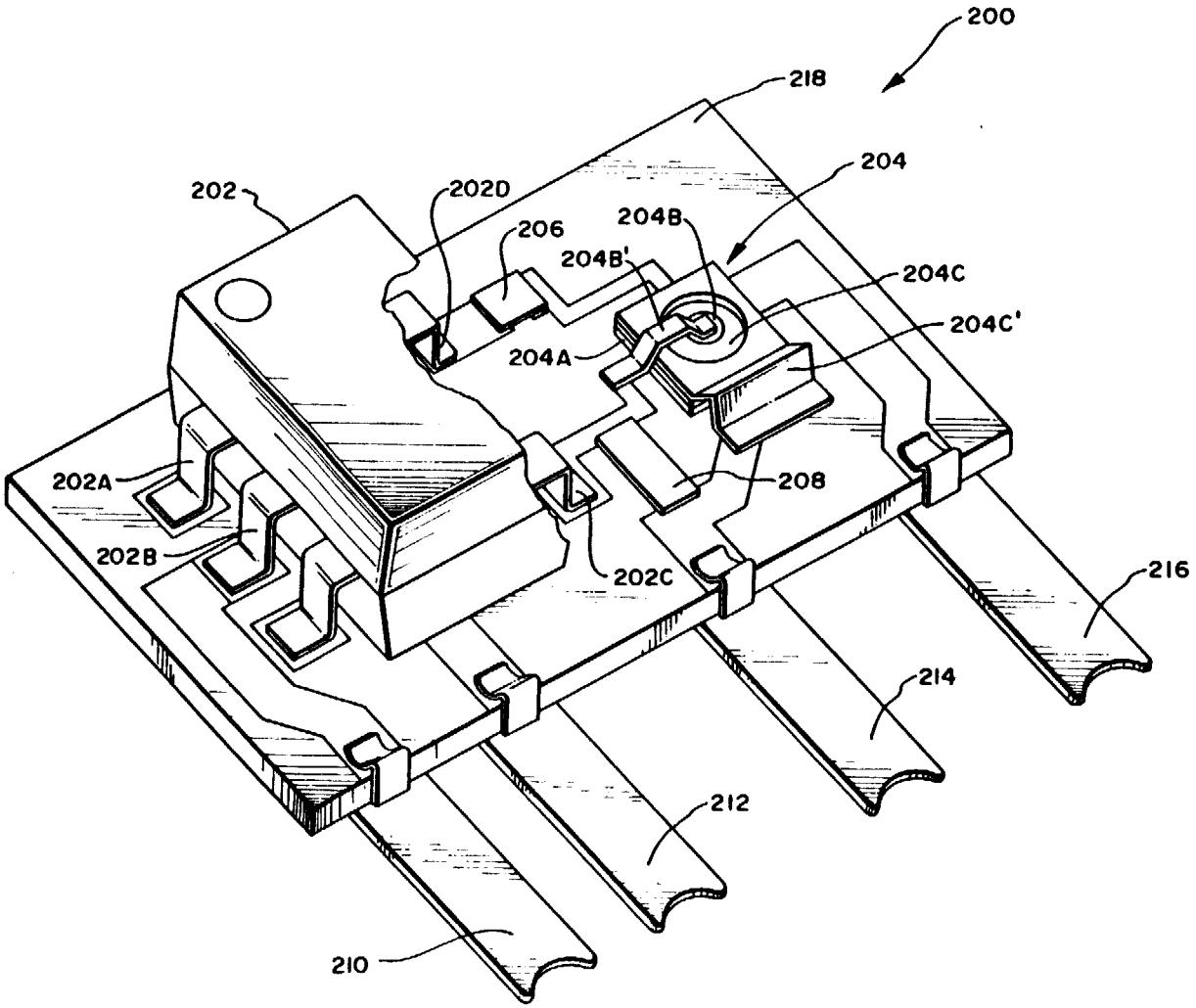
FIG. 5 is a perspective view of the circuit board layout of the solid state switching circuit illustrated in FIG. 4.

A description of the electrical components and the physical layout of solid state switching circuit 200, as well as a further description of the functions and connections of each terminal, will be provided in connection with FIGS. 4 and 5.

FIG. 4 is an electrical schematic diagram showing the electrical components, and connections therebetween, of solid state switching circuit 200. In order to provide maximum reliability, an opto-isolator device, 202 in FIG. 4, is included. Opto-isolator 202 provides an isolation means, responsive to the low voltage control current, for providing a switching signal that switches a semiconductor switching means, such as triac 204, on or off, as selected. This isolates triac 204 from the low voltage control signals at column pin 210 and row pin 212. Column pin 210 and row pin 212 are so named because they are electrically connected to column control conductor (illustrated in FIG. 3 at 311) and to row control conductor (illustrated in FIG. 3 at 321), respectively.

As represented in FIG. 4, opto-isolator device 202 internally includes a light emitting diode (LED) 203 connected to pins 210 and 212. When the proper voltage is applied to opto-isolator 202, the LED is illuminated and its radiation causes photo-silicon-controlled rectifiers (SCRs) 205 to begin conducting current. Thus, a switching signal is applied to triac 204. Since the photo SCRs 205 are connected in parallel and in opposing polarities to the AC hot bus and the AC neutral bus represented at 114 and 110 in FIG. 4, conduction during 360° of the AC cycle waveform whenever the appropriate control signal appears at terminals 210 and 212.

Resistors 206 and 208 are provided to properly bias the SCRs and triac generally designated 205 and 204. As can be seen in FIG. 4, pin 214 of circuit 200 is connected to the AC hot conductor 304 at notch 110B of terminal 110. Likewise, when triac 204 is switched on, pin 216 is connected through lamp contacts 92, 94 and prongs 114D, 112D to the AC neutral conductor 302 at notch 114B of terminal 114. Thus, when an appropriate control signal is applied to pins 210 and 212, current flows through lamp 90.

FIG. 5 shows one presently preferred layout of a circuit board for circuit 200. The devices and conductive runs included on the circuit board are formed on substrate 218. Substrate 218 is preferably a ceramic substrate. Opto-isolator device 202 is provided in a six pin DIP package, and may comprise, for example, an S11MD3 device made by Sharp Electronics Corp. The pin connections at 202A, 202B, 202C, and 202D shown in FIG. 5 correspond to pinouts 1, 2, 4, and 6, respectively, of opto-isolator device 202.

The triac, generally designated 204 in FIGS. 4 and 5, is also mounted on substrate 218. The main terminal 2 of triac 204 is indicated at 204A, the gate of triac is indicated at 204B, and main terminal 1 of triac 204 is indicated at 204C. In the illustrated embodiment, triac 204 is rated for at least 10 amps. The connection between the circuit board runs and the triac gate 204B and main terminal 1 204C are made by gate preform 204B' and main terminal preform 204'. Any suitable semiconductor or electromechanical switch device could be employed in accordance with the present invention.

Resistor 206, as represented in FIGS. 4 and 5, is a thick film resistor, which in the illustrated embodiment is commercially available from many thick film sources and has a value of 330 ohms. Similarly, resistor 208 has a value of 1K ohms.

The interconnections on the circuit board of circuit 200 are made using techniques well known in the art. The devices mounted on circuit board 200 are soldered into place as are board pins 210, 212, 214, and 216.

After the components and structures have all been mounted on substrate 218, the substrate and the components mounted thereon are conformally coated to make the solid state lamp controller impervious to moisture and minor physical damage. In FIG. 2 the coating covering the controller board is labeled 220 and is shown partially cut away.

Figure 6:
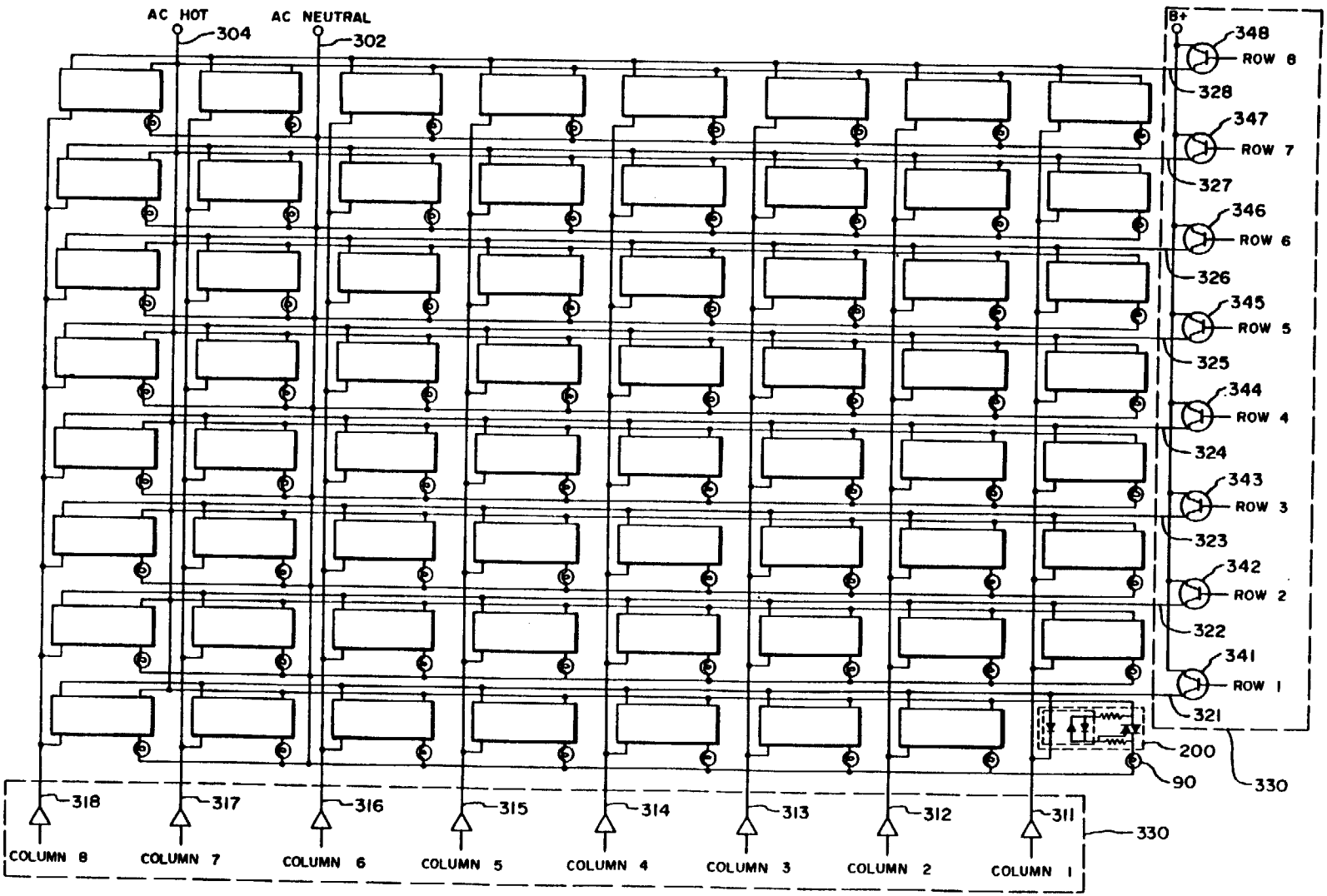
FIG. 6 is a schematic diagram showing the electrical interconnections between the lamp sockets, the current supplying conductors, and the control conductors.
Figure 7:
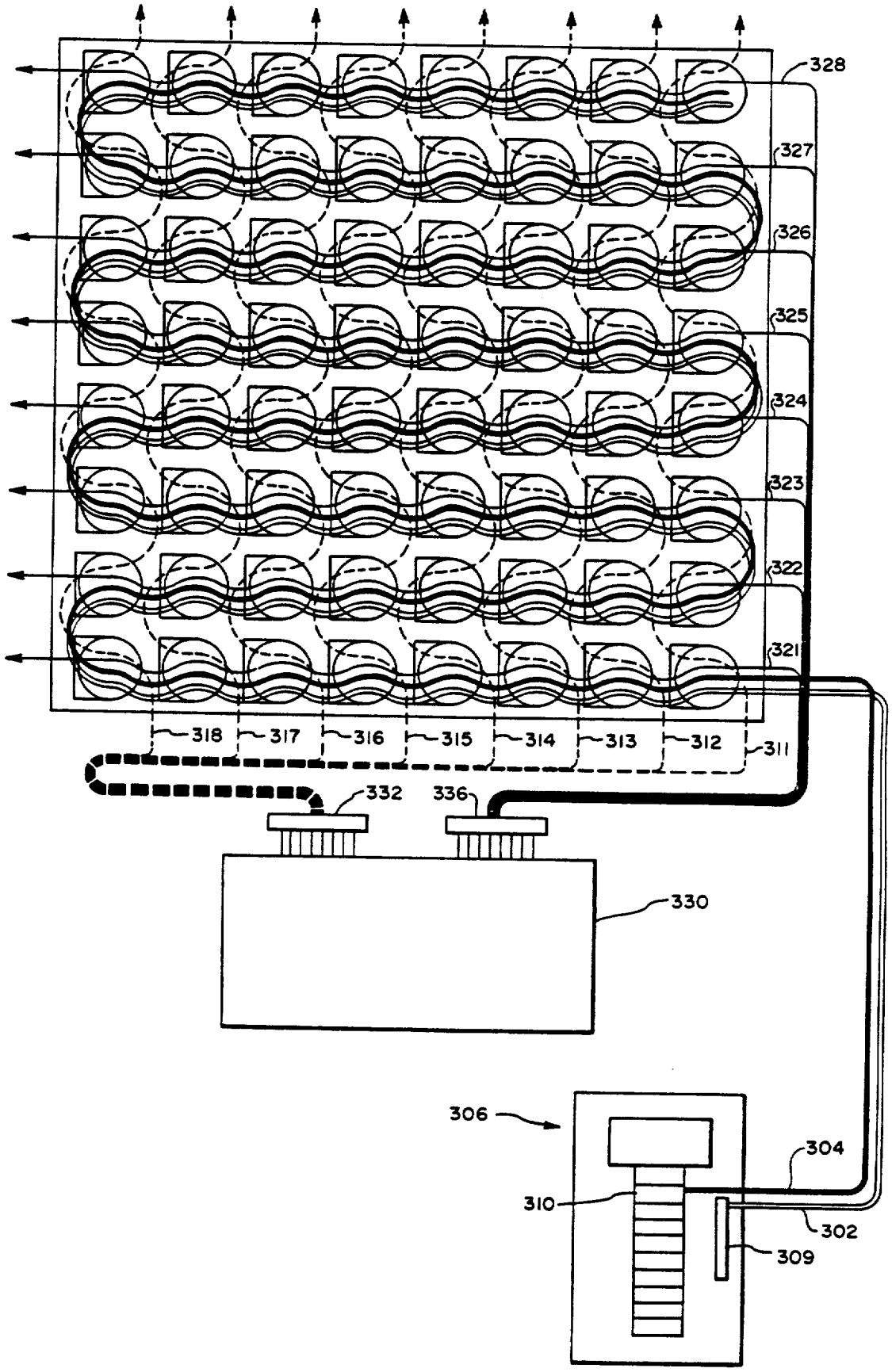
FIG. 7 is a diagram illustrating the physical wiring layout used for connecting the lamp sockets, the curret supplying conductors, and the control conductors.

FIG. 6 is a schematic diagram showing the electrical relationship between the lamps and their individual socket means, forming an 8 by 8 matrix which may form a segment of a larger light matrix display. The individual sockets of each lamp base 101 are not explicitly represented in FIG. 6 but the individual lamps 90 and switching circuits 200 are represented. FIG. 7 is a diagram showing the physical wiring diagram for neutral conductor 302, hot conductor 304, column conductors 311-318, and row conductors 321-328.

In FIG. 6, each switching circuit 200 is represented by a rectangular block. One block, labeled 200 and corresponding to the position located at the intersection of the first column control conductor and the first row control conductor, is provided with the schematic diagram of the switching circuit. Each switching circuit is of identical construction. Likewise, each lamp represented in FIG. 6, one of which is labeled 90, is identical and connected to the switching circuit 200 in an identical fashion.

As shown in FIG. 6, the AC neutral bus 302 and AC hot bus 304 are wired in parallel to each of the lamps and their corresponding switching circuits 200. Furthermore, eight column control conductors 311-318 and eight row control conductors 321-328 are provided. The row and column control conductors are connected to a control unit 330 schematically represented by the dashed boxes labeled 330 in FIG. 6.

As best represented in FIG. 6, the arrangement of eight row control conductors and eight column control conductors provides an eight by eight matrix. It will be appreciated that by applying appropriate voltages to the collectors and bases of transistors 341-348, and by connecting the appropriate column control conductor to ground, any of the solid state switching circuits 200 can be selectively caused to illuminate its associate lamp 90.

For example, by asserting row control conductor 321 for the first row and column control conductor 311 for the first column, one lamp located at the intersection of the two control conductors, the lamp labeled 90, will be illuminated. Similarly, any lamp within the matrix may be selectively illuminated. Furthermore, it will be readily realized that the principles explained herein may be expanded to include a much larger matrix than the eight by eight matrix illustrated herein.

Further advantages which accrue by using the arrangement of the socket means and system of the present invention can be understood best by reference to FIG. 7. In previously available light matrix display systems a great number of high current capacity conductors (e.g.. 12 gauge or 14 gauge conductors) were required between each lamp and the driver package. This arrangement required a large amount of human attention during assembly and also made maintenance, repair, and troubleshooting difficult in some instances. Furthermore, the long runs of large conductors carrying high currents which were switched on and off often caused inductive surges which themselves caused component failure or decreased reliability of the system.

FIG. 7 represents a vew from the rear (i.e., the non-viewing side) of a panel of the display system of the present invention incorporating an $8 \times 8$ bank. The diagram of FIG. 7 has been simplified to most clearly show the actual routing of conductors used in the presently preferred embodiments.

As shown in FIG. 7, each lamp holder is directly wired to a first conductor means that comprises a single hot current conductor 304 and a single neutral conductor 302 which together provide the necessary power for each lamp. The conductors 304 and 302 are wired directly to the neutral bus 309 or a circuit breaker 310 in a load center 306.

The wiring of the display system of the present invention is considerably simplified over previously available display systems. This is true even though the length of conductors needed to wire the banks may actually increase in some installations over what was required in previously available systems.

A single neutral conductor 302 is connected to the base terminals of each socket means at neutral terminal 114 as shown in FIG. 3. Likewise, a single hot conductor is connected to each base terminal 110, also as shown in FIG. 3. Depending upon the power consumed by the lamps in a bank, neutral conductor 302 and hot conductor 304 may be 14 gauge conductors.

In FIG. 7, the wave pattern in the wiring paths indicates the path taken by the wiring around the water hat 124 (shown in FIGS. 1 and 2) provided on each base. The waves in the wire paths also permit any condensation forming on the conductors to drop between the lamps rather than directly upon the lamps or the socket means.

The column control conductors 311–318 and the row control conductors 321–328 are appropriately connected to column terminals 106 and row terminals 108, respectively. The control conductors may generally be 18 gauge conductors. The row and column control conductors are connected to the system controller 330 by way of connectors 332 and 336, respectively. In this way each socket means is connected to one row control conductor and one column control conductor.

The wiring of the display system of the present invention is greatly simplified over previously available systems, which required heavy gauge conductors running between each lamp socket and a driver pack. Furthermore, the switching circuits 200 are distributed over a wide area, thus improving ventilation and ambient conditions for operating circuits 200. The present invention is also much more efficient and economical in assembly and maintenance than previous systems. The complete display system may be controlled by a high speed digital control system represented by the block 330 in FIG. 7. Since only low voltage and low current control signals are required to directly drive even a very large matrix, digital electronics using microprocessors may be readily adapted for use with the present invention.

Maintenance of the system of the present invention is easily accomplished since the system components most susceptible to failure, the lamp, the triac, and the lamp socket, may be easily isolated and replaced. Furthermore, all three of the mentioned components may be replaced by a technician at a single location rather than requiring the technician to move back and forth from the lamp socket to a separate driver pack.

Moreover, the present invention allows a simplified wiring scheme to be used thus facilitating rapid, low cost assembly and maintenance of the display system. Low voltage control signals allow the use of high speed microprocessor controlled digital system controllers. Furthermore, the present invention avoids inductive surges caused by switching high currents over long conductor runs as well as allowing high current devices to be isolated from low current devices. The present invention also generates much less switching noise than previously available systems and the present system may be conveniently wired directly to current supplying buses to carry current to each individual lamp holder.

It will be appreciated that the present invention may be embodied in specific forms other than the illustrated embodiment without departing from the invention's spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A light matrix display system comprising:

a matrix support member and a plurality of lamps supported thereon in rows and columns so as to form an X-Y matrix, said lamps being individually electrically controllable within said matrix as to an on or off condition by selective application of high voltage power and low voltage control circuit;

first conductor means for supplying to said lamps said power;

second conductor means for supplying said low voltage control current;

base means for receiving one of said lamps;

first terminal means associated with said base means for electrically contacting said first conductor means so as to supply said power to said lamp;

second terminal means associated with said base means for electrically contacting said second conductor means so as to supply said low voltage control current to said base means; and switching circuit means located at said base means and electrically interconnected between said first and second terminal means for electronically switching said lamp to the on or off condition by selective application of said power to said lamp in response to said low voltage control current supplied to said base means, said switching circuit means comprising means for removable connection to said first and second terminal means so that said switching circuit means may be removed and replaced at said base means independent of said lamp and said base means if said switching circuit means is found to be defective.

2. A light matrix display system as defined in claim 1 wherein said first conductor means comprises a hot conductor and a neutral conductor, and wherein said lamps are each electrically connected in parallel to both said conductors.

3. A light matrix display system as defined in claim 1 wherein said second conductor means comprises:

one row conductor for each row of lamps in said X-Y matrix, whereby the lamps of each row are electrically connected in parallel to the corresponding row conductor for that row; and one column conductor for each column of lamps in said X-Y matrix, wherreby the lamps of each column are electrically connected in parallel to the corresponding column conductor for that column.

4. A light matrix display system as defined in claim 1 wherein said base means comprises means for removably receiving said lamps so that said lamp can be removed and replaced if said lamp is found to be defective.

5. A light matrix display system as defined in claim 1 wherein said base means comprises means for detachably mounting said base means to said matrix support member so that said base means may be detached and replaced at said matrix support member.

6. A light matrix display system as defined in claim 1 wherein said base means comprises means for shielding said switching circuit means so as to protect said switching circuit means from rain or debris.

7. A light matrix display system as defined in claim 1 wherein said first and second terminal means each comprise a pair of terminals having a first notched portion that serves as a staging area for temporarily holding one of said conductor means, and a second notched portion for receiving said one conductor means in electrical contact when set into said second notched portion.

8. A light matrix display system as defined in claim 1 wherein said switching circuit means comprises:

isolation means electrically connected to said second terminal means, and responsive to said low voltage control current so as to provide a switching signal upon application of said low voltage control current to said second terminal means; and semiconductor switching means electrically connected to said isolation means and responsive to said switching signal so as to switch on said power at said first terminal means when said switching signal is input to said semiconductor switching means.

9. A light matrix display system as defined in claim 1 further comprising third terminal means for interconnecting said switching circuit means to another lamp located remote from said lamp of said base means so that said switching circuit means will control both the lamp at said base means and the lamp remotely located therefrom.

10. A light matrix display system comprising:

a matrix support member and a plurality of lamps supported thereon in rows and columns so as to form an X-Y matrix, said lamps being individually electrically controllable within said matrix as to an on or off condition by selective application of high voltage power and low voltage control current;

first conductor means for supplying to said lamps said power;

second conductor means for supplying said low voltage control current;

base means for removably receiving one of said lamps so that said lamp can be removed from said base means and replaced if said lamp is found to be defective, said base means comprising means for detachably mounting said base means to said matrix support member so that said base means may be detached and replaced at said support member independent of said lamp if said base means if found to be defective;

first terminal means associated with said base means for electrically contacting said first conductor means so as to supply said power to said lamp;

second terminal means associated with said base means for electrically contacting said second conductor means so as to supply said low voltage control current to said base means; and switching circuit means located at said base means and electrically interconnected between said first and second terminal means for electronically switching said lamp to the on or off condition by selective application of said power to said lamp in response to said low voltage control current supplied to said base means.

11. A light matrix display system as defined in claim 10 wherein said first conductor means comprises a hot conductor and a neutral conductor, and wherein said lamps are each electrically connected in parallel to both said conductors.

12. A light matrix display system as defined in claim 10 wherein said second conductor means comprises:

one row conductor for each row of lamps in said X-Y matrix, whereby the lamps of each row are electrically connected in parallel to the corresponding row conductor for that row; and one column conductor for each column of lamps in said X-Y matrix, whereby the lamps of each column are electrically connected in parallel to the corresponding column conductor for that column.

13. A light matrix display system as defined in claim 10 wherein said matrix support member is formed with a plurality of holes, each hole being sized to receive one of said base means and a corresponding lamp, and wherein said means for detachably mounting said base means comprises a holding clip formed on said base means and adapted to engage said matrix support member at the periphery of said hole.

14. A light matrix display system as defined in claim 10 herein said base means comprises means for shielding said switching circuit means so as to protect said switching circuit means for rain or debris.

15. A light matrix display system as defined in claim 10 wherein said first and second terminal means each comprise a pair of terminals having a first notched portion that serves as a staging area for temporarily holding one of said conductor means, and a second notched portion for receiving said one conductor means in electrical contact when set into said second notched portion.

16. A light matrix display system as defined in claim 10 wherein said switching circuit means comprises:

isolation means electrically connected to said second terminal means, and responsive to said low voltage control current so as to provide a switching signal upon application of said low voltage control current to said second terminal means; and semiconductor switching means electrically connected to said isolation means and responsive to said switching signal so as to switch on said power at said first terminal means when said switching signal is input to said semiconductor switching means.

17. A light matrix display system as defined in claim 10 wherein said switching circuit means comprises means for removable connection to said first and second terminal means so that said switching circuit means may be removed and replaced at said base means if said switching circuit means is found to be defective.

18. A light matrix display system as defined in claim 10 further comprising third terminal means for interconnecting said switching circuit means to another lamp located remote from said lamp of said base means so that said switching circuit means will control both the lamp at said base means and the lamp remotely located therefrom.

19. An improved light matrix display system which includes a matrix support member and a plurality of lamps supported in rows and columns to form an X-Y matrix on said member, said lamps being individually electrically controllable as to an on or off condition by means of first and second conductor means used for supplying high voltage electrical power to said lamps and for supplying low voltage control current for switching said lamps to the on or.off condition, wherein the improvement comprises a plurality of socket means each comprising:

base means for removably receiving one of said lamps so that said lamp can be removed from said base means and replaced if said lamp is found to be defective, said base means comprising means for detachably mounting said base means to said matrix support member so that said base means may be detached and replaced at said support member independent of said lamp if said base means is found to be defective;

first terminal means associated with said base means for electrically contacting said first conductor means so as to supply said power to said lamp;

second terminal means associated with said base means for electrically contacting said second conductor means so as to supply said low voltage control current to said base means; and switching circuit means located at said base means and electrically interconnected between said first and second terminal means for electronically switching said lamp to the on or off condition by selective application of said power to said lamp in response to said low voltage control current supplied to said base means, said switching circuit means comprising means for removable connection to said first and second terminal means so that said switching circuit means may be removed and replaced at said base means independent of said lamp and said base means if said switching circuit means is found to be defective.

20. A light matrix display system as defined in claim 10 wherein said first conductor means comprises a hot conductor and a neutral conductor, and wherein said lamps are each electrically connected in parallel to both said conductors.

21. A light matrix display system as defined in claim 20 wherein said second conductor means comprises:

one row conductor for each row of lamps in said X-Y matrix, whereby the lamps of each row are electrically connected in parallel to the corresponding row conductor for that row; and one column conductor for each column of lamps in said X-Y matrix, whereby the lamps of each column are electrically connected in parallel to the corresponding column conductor for that column.

22. A light matrix display system as defined in claim 19 wherein said base means comprises means for shielding said switching circuit means so as to protect said switching circuit means from rain or debris.

23. A light matrix display system as defined in claim 22 wherein said matrix support member is formed with a plurality of holes, each hole being sized to receive one of said base means and a corresponding lamp, and wherein said means for detachably mounting said base means comprises a holding clip formed on said base means and adapted to engage said matrix support member at the periphery of said hole.

24. A light matrix display system as defined in claim 19 wherein said first and second terminal means each comprise a pair of terminals having a first notched portion that serves as a staging area for temporarily holding one of said conductor means, and a second notched portion for receiving said one conductor means in electrical contact when set into said second notched portion.

25. A light matrix display system as defined in claim 19 wherein said switching circuit means comprises:

isolation means electrically connected to said second terminal means, and responsive to said low voltage control current so as to provide a switching signal upon application of said low voltage control current to said second terminal means; and semiconductor switching means electrically connected to said isolation means and responsive to said switching signal so as to switch on said power at said first terminal means when said switching signal is input to said semiconductor switching means.

26. A light matrix display system as defined in claim 19 further comprising third terminal means for interconnecting said switching circuit means to another lamp located remote from said lamp of said base means so that said switching circuit means will control both the lamp at said base means and the lamp remotely located therefrom.

27. A light matrix display system comprising:

a matrix support member and a plurality of lamps supported thereon in rows and columns so as to form an X-Y matrix, said lamps being individually electrically controllable within said matrix as to an on or off condition by selective application of high voltage power and low voltage control current;

first conductor means comprising a hot conductor and a neutral conductor for supplying to said lamps said power, said hot and neutral conductors each being electrically connected in parallel to each said lamp;

second conductor means comprising one row conductor for each row of lamps in said X-Y matrix, whereby the lamps of each row are electrically connected in parallel to the corresponding row conductor for that row, and further comprising one column conductor for each column of lamps in said X-Y matrix, whereby the lamps of each column are electrically connected in parallel to the corresponding column conductor for that column, said row and column conductors each providing said low voltage control current;

base mean for removably receiving one of said lamps so that said lamp can be removed from said base means and replaced if said lamp is found to be defective, said base means comprising means for detachably mounting said base means to said matrix support member so that said base means may be detached and replaced at said support member independent of said lamp if said base means is found to be defective;

first terminal means associated with said base means for electrically contacting said first conductor means so as to supply said power to said lamp;

second terminal means associated with said base means for electrically contacting said second conductor means so as to supply said low voltage control current to said base mean; and switching circuit means located at said base means and comprising isolation means electrically connected to said second terminal means and responsive to said low voltage control current so as to provide a switching signal upon application of said low voltage control current to said second terminal means, and further comprising semiconductor switching means electrically connected to said isolation means and responsive to said switching signal so as to switch on said power at said first terminal means when said switching signal is applied to said semiconductor switching means, and said switching circuit means further comprising means for removable connection to said first and second terminal means so that said switching circuit means may be removed and replaced at said base means independent of said lamp and said base means if said switching circuit means is found to be defective.

28. A light matrix display system as defined in claim 27 further comprising third terminal means for interconnecting said switching circuit means to another lamp located remote from said lamp at said base means so that said switching circuit means will control both the lamp at said base means and the lamp remotely located therefrom.

*29. A light matrix display system comprising:*

*a matrix support member and a plurality of lamps supported thereon in rows and columns so as to form an X-Y matrix, said lamps being individually electrically controllable within said matrix as to an on or off condition by selective application of power;*

*conductor means for supplying to said lamps said power;*

*base means for receiving one of said lamps;*

*terminal means associated with said base means for electrically contacting said conductor means so as to supply said power to said lamp; and*

*wherein said terminal means comprises a pair of terminals having a first notched portion that serves as a staging area for temporarily holding said conductor means, and a second notched portion for receiving said conductor means in electrical contact when set into said second notched portion.*

*30. In an improved light matrix display system having a plurality of lamps arranged in rows and columns so as to form an X-Y matrix, said lamps being individually electrically controllable within said matrix as to an on or off condition by selective application of power, the improvement comprising:*

*conductor means for supplying to said lamps said power;*

*a separate base means for receiving each of said lamps;*

*terminal means associated with said base means for electrically contacting said conductor means so as to supply said power to said lamp; and*

*wherein said terminal means comprises a staging area means for temporarily holding said conductor means, and receiving means for receiving said conductor means in electrical contact when set into said receiving means from said staging area means.*

*31. A light matrix display system as defined in claim 30 wherein said staging area means comprises a first notched portion for temporarily holding said conductor means and wherein said receiving means comprises a second notched portion for receiving said conductor means in electrical contact when set into said second notched portion from said first notched portion.*

*32. In an improved light matrix display system having a plurality of lamps arranged in rows and columns so as to form an X-Y matrix, said lamps being individually electrically controllable within said matrix as to an on or off condition by selective application of power, the improvement comprising:*

*a separate base means for receiving each of said lamps;*

*terminal means associated with each said base means for electrically contacting a conductor which supplies power to said lamps; and*

*wherein said terminal means comprises a staging area means for temporarily holding said conductor in non-electrical contact and receiving means for receiving said conductor in electrical contact when the conductor is moved from said staging area means into said receiving means.*

* * * * *

UNITED STATES PATENT AND TRADEMARK OFFICE

CERTIFICATE OF CORRECTION

PATENT NO. : Re. 34,135

DATED : December 1, 1992

INVENTOR(S) : BRENT MADSEN et al.

It is certified that error appears in the above-identified patent and that said Letters Patent is hereby corrected as shown below:

Column 2, line 42, "on" should be --one--
Column 3, line 40, "or" should be --nor--
Column 5, line 2, "conductor" should be --conductors--
Column 8, line 38, "FIG. 3" should be --FIG. 2--
Column 14, line 8, "if found" should be --is found--
Column 14, line 48, "herein" should be --wherein--

Signed and Sealed this

Twenty-third Day of November, 1993

*Attest:*

Bruce Lehman

BRUCE LEHMAN

*Attesting Officer*

*Commissioner of Patents and Trademarks*